`US010234125B2`

(12) United States Patent
Smith et al.

(10) Patent No.: US 10,234,125 B2
(45) Date of Patent: Mar. 19, 2019

(54) LIGHTS INTEGRATED COOLING SYSTEM FOR INDOOR GROWING ENVIRONMENTS

(71) Applicant: Bright Agrotech, Inc., Laramie, WY (US)

(72) Inventors: Damon Henry Smith, Laramie, WY (US); Kevin Grauberger, Laramie, WY (US)

(73) Assignee: MJNN, LLC, South San Francisco, CA (US)

( * ) Notice: Subject to any disclaimer, the term of this patent is extended or adjusted under 35 U.S.C. 154(b) by 92 days.

(21) Appl. No.: 15/647,294

(22) Filed: Jul. 12, 2017

(65) Prior Publication Data

US 2018/0017244 A1    Jan. 18, 2018

Related U.S. Application Data

(60) Provisional application No. 62/363,538, filed on Jul. 18, 2016.

(51) Int. Cl.
*F21V 29/57*    (2015.01)
*F21V 29/58*    (2015.01)
(Continued)

(52) U.S. Cl.
CPC .............. *F21V 29/57* (2015.01); *A01G 7/045* (2013.01); *A01G 9/26* (2013.01); *F21S 2/00* (2013.01);
(Continued)

(58) Field of Classification Search
CPC ..... F21S 2/00; F21S 2/005; F21S 4/28; F21V 25/02; F21V 29/05; F21V 29/57;
(Continued)

(56) References Cited

U.S. PATENT DOCUMENTS

| | | |
|---|---|---|
| 6,880,952 B2 | 4/2005 | Kiraly |
| 2009/0190350 A1 | 7/2009 | Tseng |

(Continued)

FOREIGN PATENT DOCUMENTS

WO  PCT/CN2014/084718       1/2014
WO       WO 2016061637 A1 *  4/2016  ............. A01G 9/247

*Primary Examiner* — Hargobind Sawhney
(74) *Attorney, Agent, or Firm* — Patent Law Office of David G. Beck

(57) ABSTRACT

A lights integrated cooling system for providing environmental temperature controls for indoor growing environments is provided. The indoor growing environment has a predetermined target temperature. The system comprises a frame structure having top and bottom plumbing manifolds. A water cooled light bar is provided having first and second ends with the first end being fluidly connected to the top plumbing manifold and the second end being fluidly connect to the bottom plumbing manifold. A chiller is fluidly connected to the top plumbing manifold, the light bar and the bottom plumbing manifold. An amount of coolant circulates through the chiller, the top plumbing manifold, the light bar, and the bottom manifold. Heat from the light bar is transferred to the coolant thereby raising the temperature of the coolant. The chiller reduces the temperature of the coolant and the coolant leaving the chiller is chilled to a predetermined leaving water temperature. Heat transfer from the coolant results in the predetermined target temperature being approximately equal to the predetermined leaving water temperature.

12 Claims, 9 Drawing Sheets

(51) Int. Cl.
  *F21S 4/28*    (2016.01)
  *A01G 7/04*    (2006.01)
  *F21V 25/02*   (2006.01)
  *A01G 9/26*    (2006.01)
  *F21S 2/00*    (2016.01)
  *F21Y 103/10*  (2016.01)
  *F21Y 115/10*  (2016.01)

(52) U.S. Cl.
  CPC ............ *F21S 4/28* (2016.01); *F21V 25/02* (2013.01); *F21V 29/58* (2015.01); *F21V 29/59* (2015.01); *F21Y 2103/10* (2016.08); *F21Y 2115/10* (2016.08); *Y02A 40/274* (2018.01); *Y02P 60/146* (2015.11)

(58) Field of Classification Search
  CPC ...... F21V 29/58; F21V 29/59; F21Y 2115/10; F21Y 2103/10
  See application file for complete search history.

(56) References Cited

U.S. PATENT DOCUMENTS

| | | |
|---|---|---|
| 2011/0075416 A1 | 3/2011 | Chou et al. |
| 2011/0304270 A1 | 12/2011 | Scarpelli |
| 2014/0185300 A1 | 7/2014 | Martinez et al. |
| 2015/0284266 A1 | 10/2015 | Matsui |
| 2015/0308631 A1 | 10/2015 | Gorman |
| 2016/0286733 A1* | 10/2016 | Fair .................. A01G 22/00 |

* cited by examiner

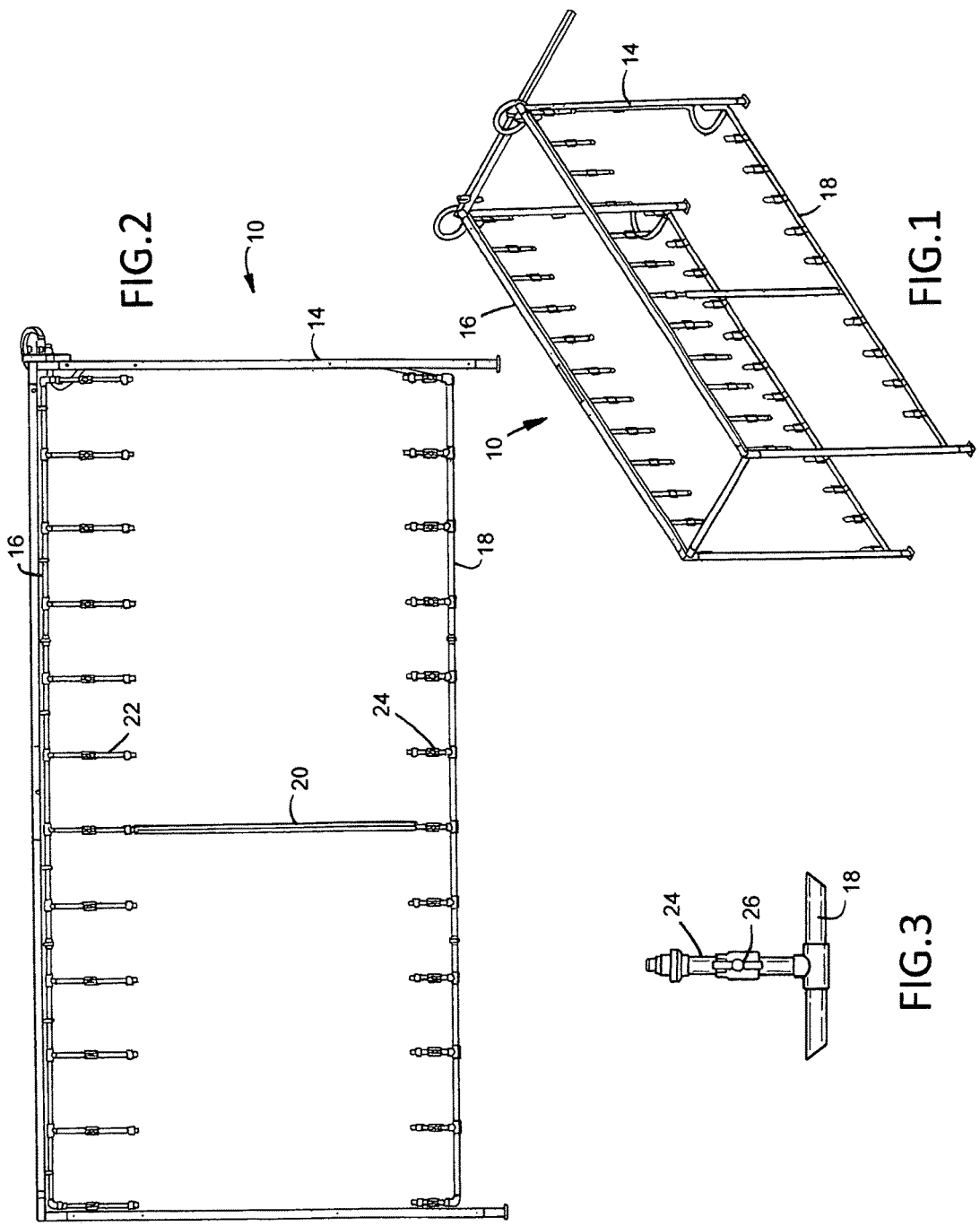

LIGHTS INTEGRATED COOLING SYSTEM FOR INDOOR GROWING ENVIRONMENTS

The present application claims benefit of priority from U.S. provisional patent application Ser. No. 62/363,538, filed Jul. 18, 2916, entitled "Lights Integrated Cooling System for Indoor Growing Environments".

BACKGROUND OF THE INVENTION

1. Field of the Invention

This invention relates generally to a lights integrated cooling system for indoor growing environments and, more particularly, the invention relates to a lights integrated cooling system for Indoor growing environments by allowing simple, lighting integrated cooling and heating of the growing environment by moving the chiller temperature set point up or down, or by increasing or decreasing the flow of chilled water to the lights, which function as heat exchangers.

2. Description of the Prior Art

Indoor grow lights have traditionally used incandescent or fluorescent light sources. Recently, grow lights have been introduced which use light emitting diodes (LEDs) light sources. LEDs are new a lighting technology in the grow light industry. LEDs emit light at specific wavelength bands depending upon the type of diode. Because of this narrow wavelength band a white LED is actually comprised of a mix of different color LEDs to create the white light, or a single colored LED, usually blue, with a filter over it. The intensity of an LED may be controlled as well allowing the LEDs to be dimmed.

Like any other industry, the agricultural industry seeks to increase production and lower operating costs of its products. Generally, plants exposed to more blue light tend to grow stouter and with broader leads. Plants exposed to more red light tend to grow faster and taller but with thinner stems and smaller leaves.

LED technology has made significant gains in recent years. The efficiency and light output of LED's has increased exponentially since the 1960's, with a doubling occurring about every 36 months. As a result, LED technology can now be successfully deployed for grow light applications, to provide high-efficiency, low cost, safe and long-lasting grow light solutions. However, the performance of LED grow lights varies, and there is an ongoing need in the grow light industry for high-performance grow lights that maximize photosynthesis, plant growth and flowering. In addition, it is desirable to reduce the heat generated by the LED grow lights.

Heat can damage sensitive electronic components, degrading reliability and hampering the ability to concentrate higher power levels into smaller packages. Many applications would benefit from the ability to closely package LEDs into compact configurations, but the heat levels generated have always been a limiting factor. As LEDs become more sophisticated, eliminating internal heat build-up has also become increasingly difficult. Devices are becoming more powerful and creating solutions for removing the resulting heat generation often pose great challenges. The drive current through an LED must be controlled. High current densities within the junction of the chip cause partial overheating which damages the crystalline structure of the LED die. At these areas are so called dark line defects, where light ceases to be generated. By rapidly transporting heat away from the junction, dark line defect generation can be reduced or eliminated. Therefore, it is desirable to cool the LEDs in an expedient and economical manner.

SUMMARY

The present invention is a lights integrated cooling system for providing environmental temperature controls for indoor growing environments. The indoor growing environment has a predetermined target temperature. The lights integrated cooling system comprises a frame structure having a top plumbing manifold and a bottom plumbing manifold. A water cooled light bar is provided having a first end and a second end with the first end of the light bar being fluidly connected to the top plumbing manifold and the second end of the light bar being fluidly connect to the bottom plumbing manifold. A chiller is fluidly connected to the top plumbing manifold, the light bar and the bottom plumbing manifold. An amount of coolant circulates through the chiller, the top plumbing manifold, the light bar, and the bottom manifold. Heat from the light bar is transferred to the coolant thereby raising the temperature of the coolant. The chiller reduces the temperature of the coolant received from the light bar and the coolant leaving the chiller is chilled to a predetermined leaving water temperature. Heat transfer from the coolant to the indoor growing environment or from the indoor growing environment to the coolant results in the predetermined target temperature being approximately equal to the predetermined leaving water temperature.

In addition, the present invention includes a method for providing environmental temperature controls for indoor growing environments. The indoor growing environment having a predetermined target temperature. The method comprises providing a frame structure having a top plumbing manifold and a bottom plumbing manifold, providing a water cooled light bar having a first end and a second end, fluidly connecting the first end of the light bar to the top plumbing manifold, fluidly connecting the second end of the light bar to the bottom plumbing manifold, fluidly connecting a chiller to the top plumbing manifold, the light bar and the bottom plumbing manifold, circulating an amount of coolant through the chiller, the top plumbing manifold, the light bar, and the bottom manifold, transferring heat from the light bar to the coolant, raising the temperature of the coolant, reducing the temperature of the coolant with the chiller to a predetermined leaving water temperature, and transferring heat from the coolant to the indoor growing environment or from the indoor growing environment to the coolant resulting in the predetermined target temperature being approximately equal to the predetermined leaving water temperature.

The present invention further includes a lights integrated cooling system for providing environmental temperature controls for indoor growing environments. The indoor growing environment having a predetermined target temperature. The lights integrated cooling system comprises a frame structure having a top plumbing manifold and a bottom plumbing manifold. A water cooled light bar is provided having a first end and a second end with the first end of the light bar being fluidly connected to the top plumbing manifold and the second end of the light bar being fluidly connect to the bottom plumbing manifold. A chiller fluidly connected to the top plumbing manifold, the light bar and the bottom plumbing manifold with the chiller having a built-in pump and tank. An amount of coolant circulates through the chiller, the top plumbing manifold, the light bar, and the bottom manifold. A temperature and humidity sensor is positioned in the indoor growing environment with the sensor communicating with a controls device that adjusts the leaving water temperature of the chiller as temperature and humidity fluctuates. Ducting distributes air throughout the indoor farming environment, or out of the farming environment. A cooling tower is fluidly connected between the chiller and the light bar for passive cooling of the coolant. Heat from the light bar is transferred to the coolant thereby raising the temperature of the coolant. The chiller reduces the temperature of the coolant received from the light bar and the coolant leaving the chiller is chilled to a predetermined leaving water temperature. Heat transfer from the coolant to the indoor growing environment or from the indoor growing environment to the coolant results in the predetermined target temperature being approximately equal to the predetermined leaving water temperature. The predetermined leaving water temperature is achieved by adjusting a chiller temperature set point or by adjusting a volume of chilled water flowing through the light bar.

BRIEF DESCRIPTION OF THE DRAWINGS

FIG. 1 is a perspective view illustrating a lights integrated cooling system for indoor growing environments, constructed in accordance with the present invention, having a structure for holding irrigation and lights and at least one water cooled light bar mounted within a plumbing manifold;

FIG. 2 is an elevational plan view illustrating the lights integrated cooling system for indoor growing environments of FIG. 1, constructed in accordance with the present invention;

FIG. 3 is an elevational plan view illustrating a combined first union and valve of the lights integrated cooling system for indoor growing environments, constructed in accordance with the present invention, allowing removal of a water cooled light bar during operation;

DETAILED DESCRIPTION OF THE PREFERRED EMBODIMENTS

Figure 4:
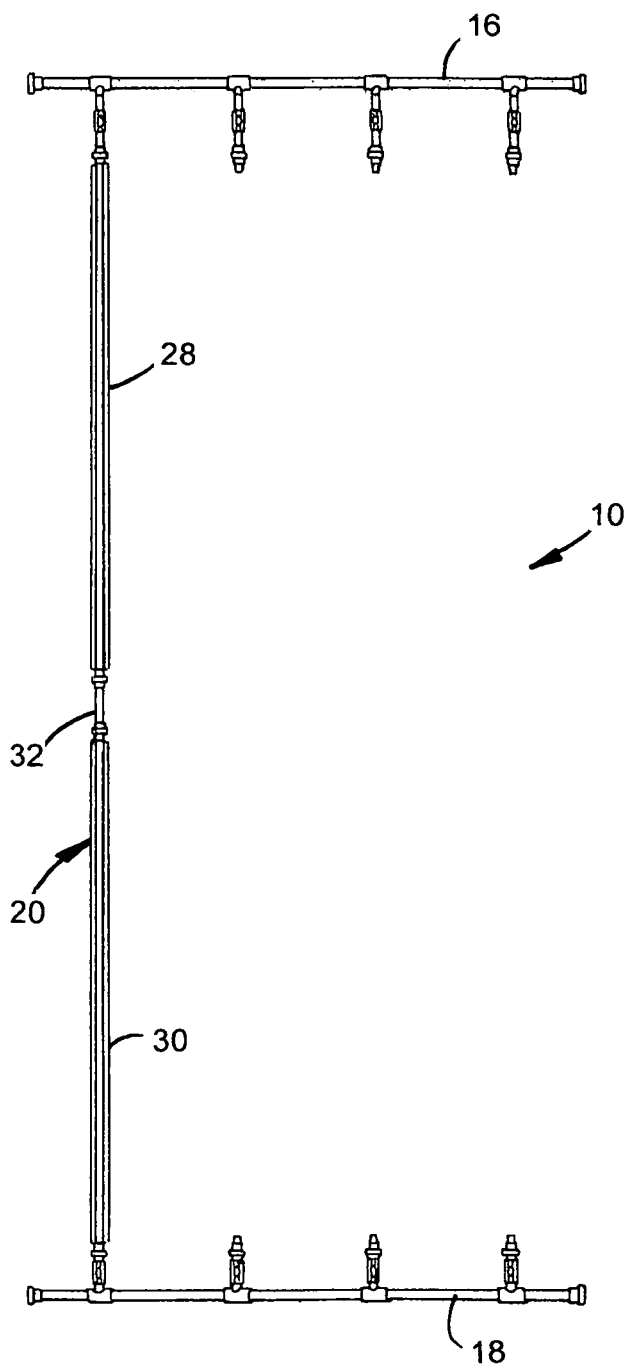
FIG. 4 is an elevational plan view illustrating the lights integrated cooling system for indoor growing environments, constructed in accordance with the present invention, with stacked water cooled light bars joined by a second union.
Figure 5:
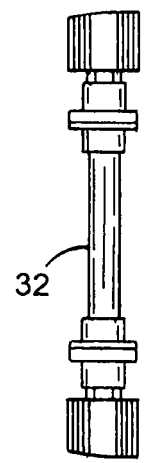
FIG. 5 is an elevational plan view illustrating the lights integrated cooling system for indoor growing environments of FIG. 4, constructed in accordance with the present invention, with the second union allowing easy installation and removal of the water cooled light bars.

As illustrated in FIGS. 1-10, the present invention is a lights integrated cooling system, indicated generally at 10, for indoor growing environments. The purpose of the lights integrated cooling system 10 of the present invention is to provide environmental temperature controls for indoor growing environments 12. Typically, temperature control can be difficult in indoor growing environments and relies on extensive and customized Heating, Ventilation and Air Conditioning (HVAC) systems. The lights integrated cooling system 10 allows very simple, lighting integrated cooling and heating of the indoor growing environment 12 by moving a chiller temperature set point up or down or by increasing or decreasing the volume of chilled water flowing through the lighting.

The lights integrated cooling system 10 of the present invention includes a frame structure 14 having a top plumbing manifold 16 and a bottom plumbing manifold 18. Fluidly connected to and extending between the top plumbing manifold 16 and the bottom plumbing manifold 18 is at least one water cooled light bar 20 having a first end and a second end. The first end of the light bar 20 is connected to the top plumbing manifold 16 and the second end of the light bar 20 is connected to the bottom plumbing manifold 18. Preferably, there are a plurality of light bars 20 extending between the top plumbing manifold 16 and the bottom plumbing manifold 18. Each of the light bars 20 consist of a system of aluminum or metal-bodied lights or tubes suspended in the growing area 12 with coolant circulating through them, as will be described in further detail below.

In addition, the lights integrated cooling system 10 of the present invention can include a top quick connect union 22 between the first end of the light bar 20 and the top plumbing manifold 16 and a bottom quick connect union 24 between the second end of the light bar 20 and the bottom plumbing manifold 18. The top quick connect union 22 and the bottom quick connect union 24 allows the light bars 20 to be easily disconnected from the top plumbing manifold 16 and the bottom plumbing manifold 18. The quick connect unions 22, 24 can be threaded connections or other type of fluid sealing connection with the respective manifolds 16, 18. Flow switches 26 can be incorporated in each of the top quick connect union 22 and the bottom quick connect union 24 allowing the sealing quick connects to control the flow of coolant through the light bar 20 and, if desired, to also function as light switches, by turning off the lights in each circulation zone every time that coolant flow is interrupted.

In another embodiment, in addition to the top quick connect union 22 and the bottom quick connect union 24, the light bars 20 of the lights integrated cooling system 10 of the present invention include a first light portion 28 and a second light portion 30. A center quick connect union 32 is positioned between the first light portion 28 and the second light portion 30. Like the top quick connect union 22 and the bottom quick connect union 24 described above, the center quick connect union 32 allows the first light portion 28 and the second light portion 30 to be easily disconnected from between the top plumbing manifold 16 and the bottom plumbing manifold 189, respectively. The center quick connect union 32 can be threaded connections or other type of fluid sealing connection. Flow switches can be incorporated in the center quick connect union 32 allowing the sealing quick connects to control the flow of coolant through the light bar 20 and, if desired, to also function as light switches, by turning off the lights in each circulation zone every time that coolant flow is interrupted.

Typically, the light bars 20 of the lights integrated cooling system 10 of the present invention are liquid cooled LED light bars 20. Since the LED lights generate significant amounts of heat, using an inline pump or pumps, the coolant is circulated from a chiller 34 through tubing to the plumbing manifolds 16, 18 to the light bars 20, where heat from the light bars 20 is transferred to the coolant. The coolant is returned to the chiller 34 via a system of hoses and tubes.

In a preferred embodiment, the chiller 34 of the lights integrated cooling system 10 of the present invention is set at a target temperature for the growing environment and heat transfer from the coolant to the environment or from the environment to the coolant results in growing temperature closely matching the temperature of the chiller 34. Safety features can be integrated into the tubing including switches that cut off power to the light bars 20 in the instance that flow is interrupted. The safety features prevent the coolant from overheating or the light bars 20 from overheating in the instance that the chiller 34 cuts off.

A temperature sensor in the growing environment 12 informs an environmental controls computer of the temperature in the growing environment 12 which allows the computer to either change the temperature set point on the chiller 34, or to increase or decrease volumes of chilled water flowing to the light bars 20 with a flow control valve. These two techniques are constant flow/variable temperature and variable flow/constant temperature, respectively. With the first method, when the set point of the chiller is moved down, cooler water is circulated through the light bars 20 and tubing in the environment 12, causing the growing room temperature to drop as heat is transferred from the growing environment 12 to the coolant through the light bars 20 or metal tubing and hoses. When the set point is moved up, the water is warmed by the light bars 20 allowing more heat transfer from the lighting to the environment 12. This adjusting of the chiller set point can be achieved through manual set points or in response to an environmental controls system's direction. Alternately, using a constant temperature, variable flow method, temperature control of the environment can be managed by reducing or increasing the flow of water at a specific temperature through the light bars 20. This can be managed by the environmental controls system operating a flow control valve or similar device. With this method, when the flow of chilled water to the light bars 20 is reduced, the coolant heats up as it moves through the light bars 20, leading to the light bar temperature increasing and transferring heat to the growing environment 12. Likewise, as the control system specifies that higher volumes of coolant should flow to the light bars 20, more heat is absorbed from the light bars 20, reducing the relative temperature of the light bars 20 and pulling heat from the growing environment 12, causing it to cool. These methods may be used to heat, cool or maintain a constant temperature range in the growing environment 12.

Figure 6:
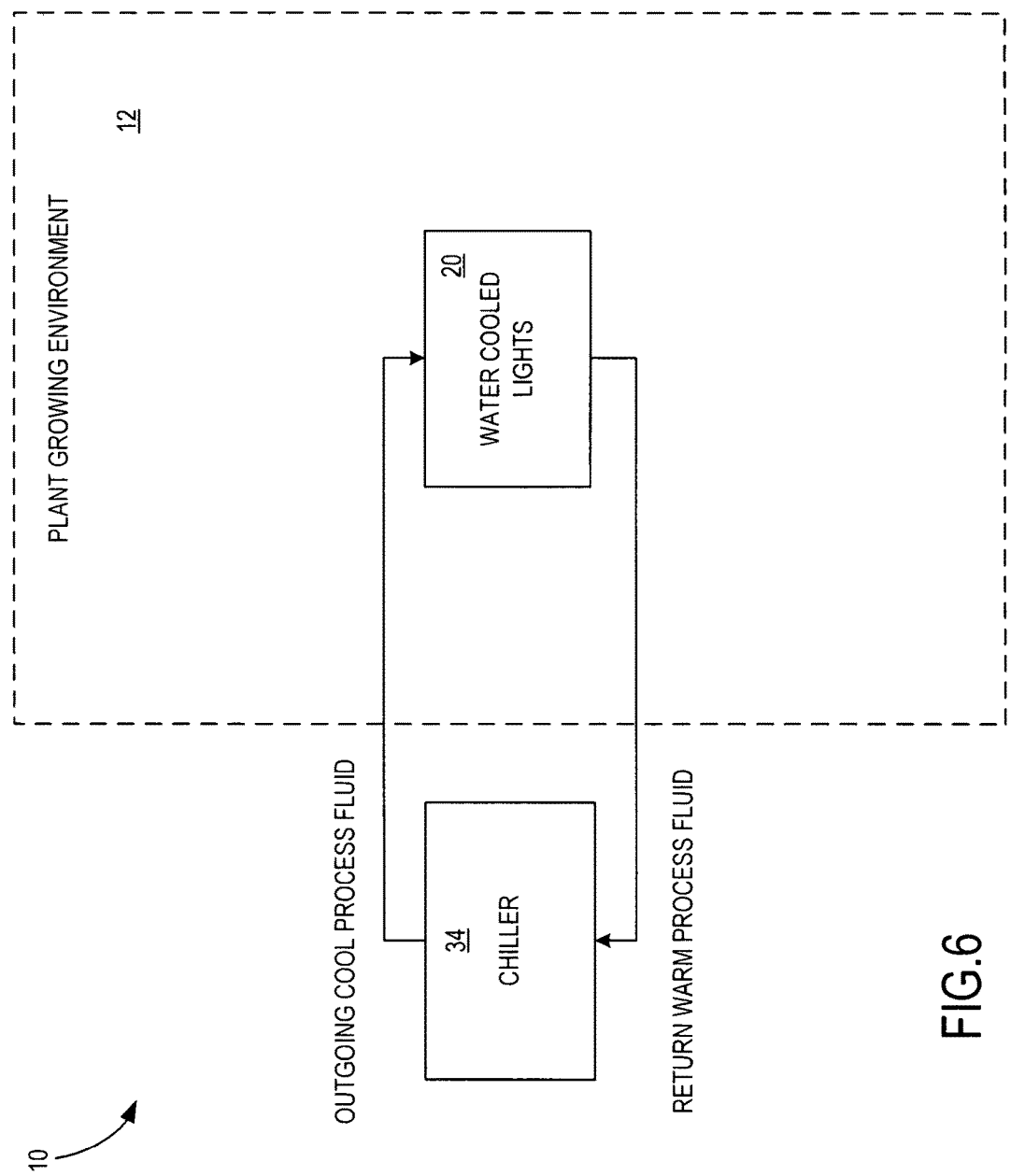
FIG. 6 is a schematic view illustrating a chiller-lights loop of the lights integrated cooling system for indoor growing environments, constructed in accordance with the present invention, having a chiller with a built-in pump and tank.

Several embodiments of the lights integrated cooling system 10 of the present invention will now be described. First, as best illustrated in FIG. 6, a chiller-lights loop is provided. Fluid, typically a glycol-water mixture, flows from the chiller 34 to the water cooled light bars 20. Preferably, a chiller 34 with a built-in pump and tank is used. Users set a leaving water temperature (LWT) that is unlikely to cause condensation on the light bars 20 based off the temperature and humidity in the grow environment. In the case condensation occurs, or conditions changes, the user changes the LWT. This setup uses constant flow of the coolant. An HVAC system will be used in conjunction with this system, but the overall load of the HVAC system will be reduced.

Figure 7:
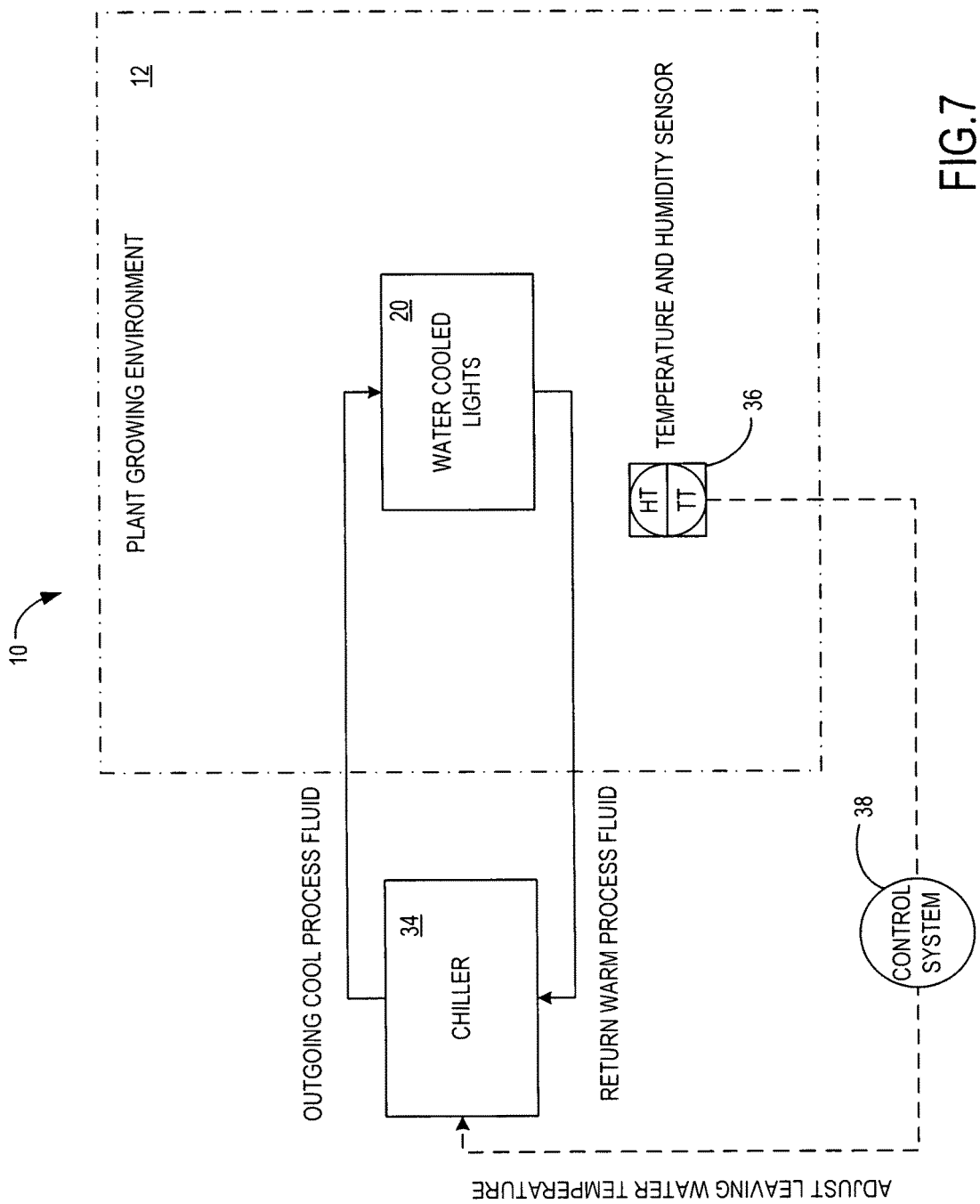
FIG. 7 is a schematic view illustrating a chiller-lights-leaving water temperature (LWT) control loop of the lights integrated cooling system for indoor growing environments, constructed in accordance with the present invention, having a temperature and humidity sensor.

Next, as best illustrated in FIG. 7, a chiller-lights-LWT control loop is provided. The same set up is used as above but a temperature and humidity transmitter 36 is placed in the environment 12. The transmitter 36 communicates with a controls device 38 that adjusts the LWT of the chiller 34 as the temperature and humidity fluctuates. If a system is put in place to collect the condensed water on the light bars 20, and the light bars 20 are water proofed, the light bars 20 themselves can be used for cooling and dehumidification processes. This process uses the light bars 20 as a large distrusted air-fluid heat exchanger. An HVAC system can be used in conjunction with this system and the overall load will still be reduced.

Figure 8:
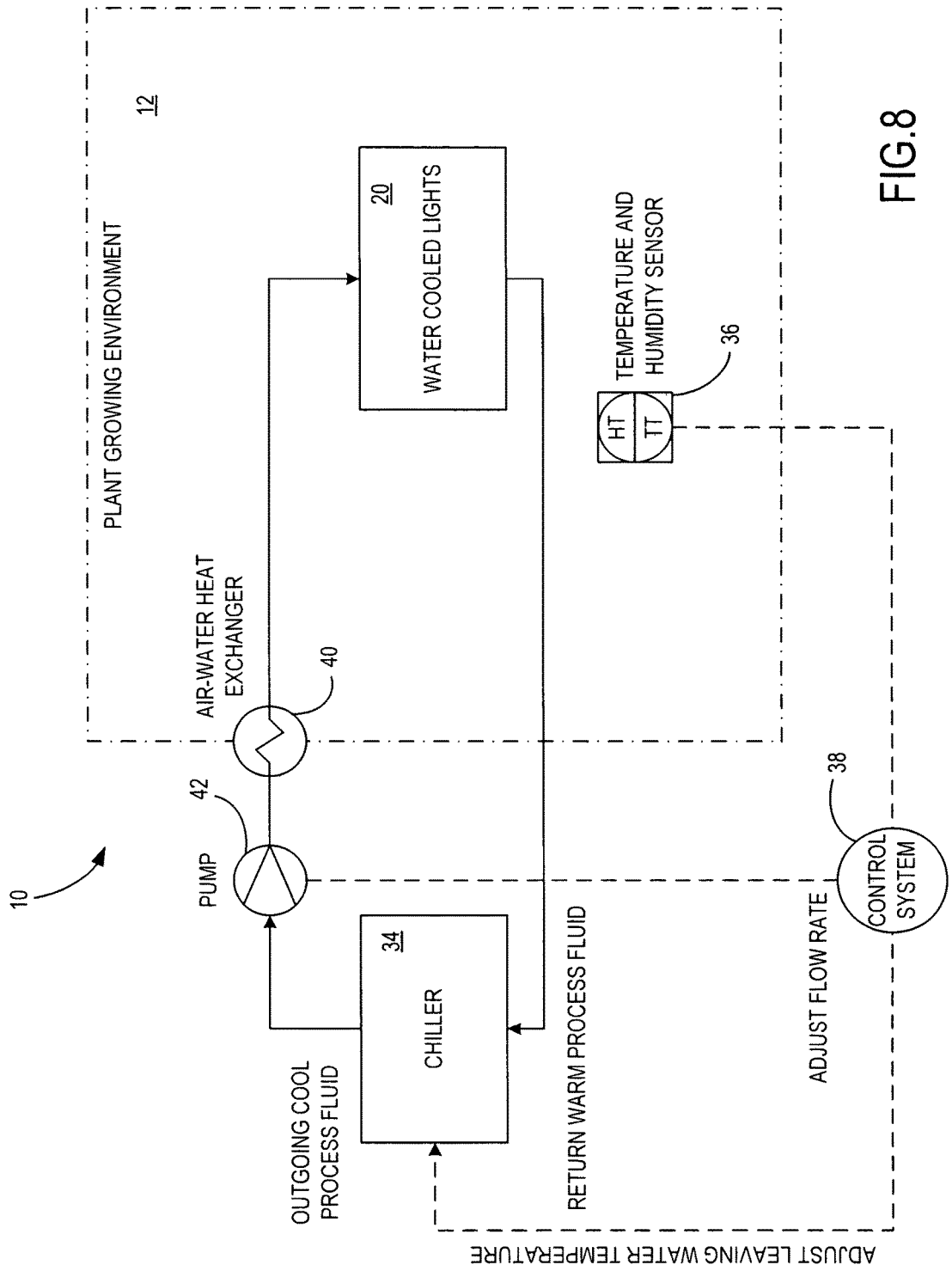
FIG. 8 is a schematic view illustrating a chiller-lights-heat exchanger series loop of the lights integrated cooling system for indoor growing environments, constructed in accordance with the present invention, having a heat exchanger added in series with the water cooled light bars.

Then, as best illustrated in FIG. 8, a chiller-lights-exchanger series loop is provided. A heat exchanger 40 is added to the system in series with the light bars 20. The heat exchanger 40 is an air-fluid heat exchanger 40 that dehumidifies and cools the air. That air can be distributed throughout the environment 12 with ducting. Setting the exchanger 40 in series with the light bars 20 allows for the water to be pre-heated before going through the light bars 20, preventing condensation on the light bars 20 from occurring. This assists with using a light bar 20 that is not water proof. A variable pump 42 can be used to adjust the flow rate depending on the temperature and humidity in the environment 12. The LWT can also be adjusted instead of the flow rate.

Figure 9:
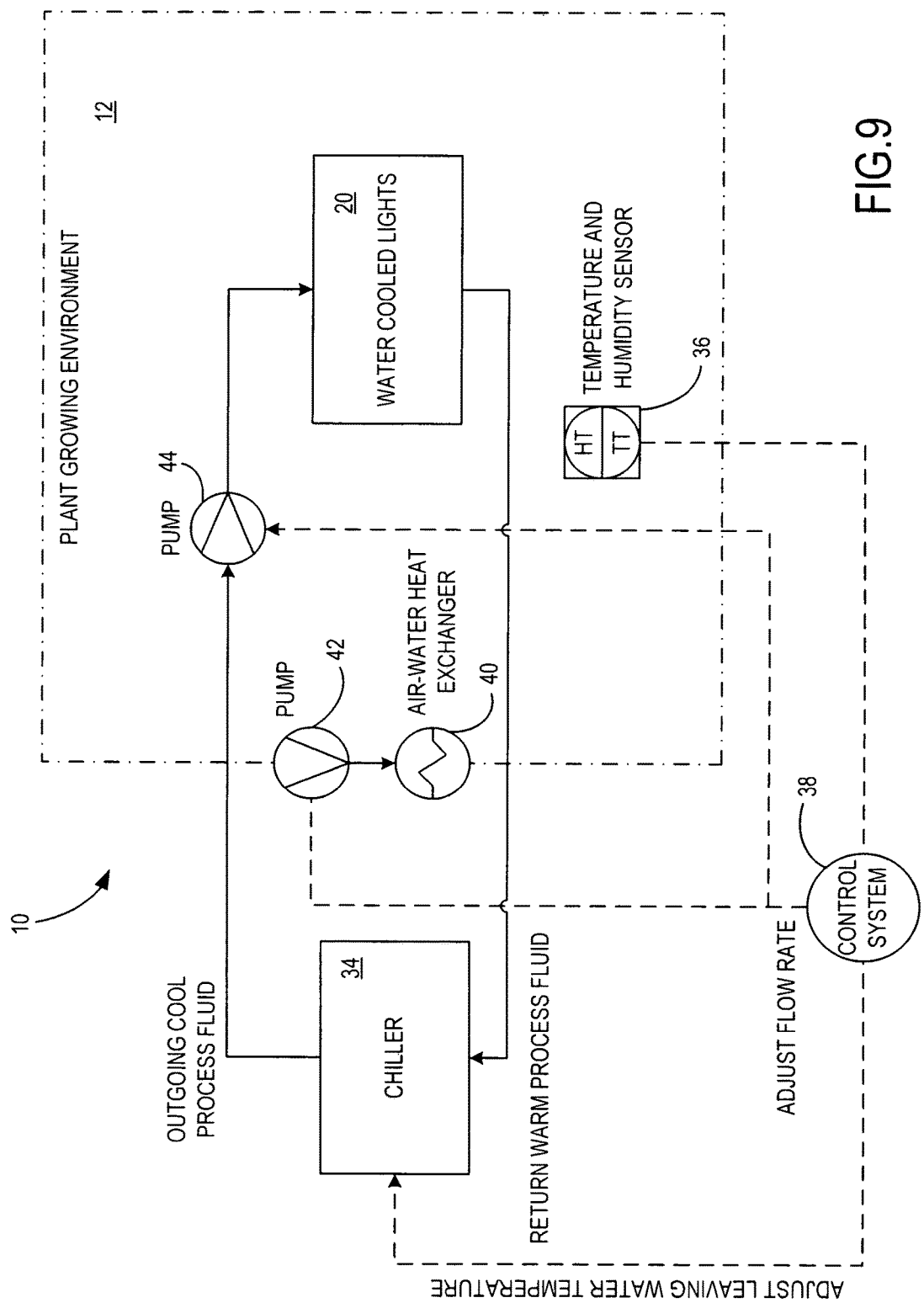
FIG. 9 is a schematic view illustrating a chiller-lights-heat exchanger parallel loop of the lights integrated cooling system for indoor growing environments, constructed in accordance with the present invention, with the heat exchanger used in parallel with the water cooled light bars.
Figure 10:
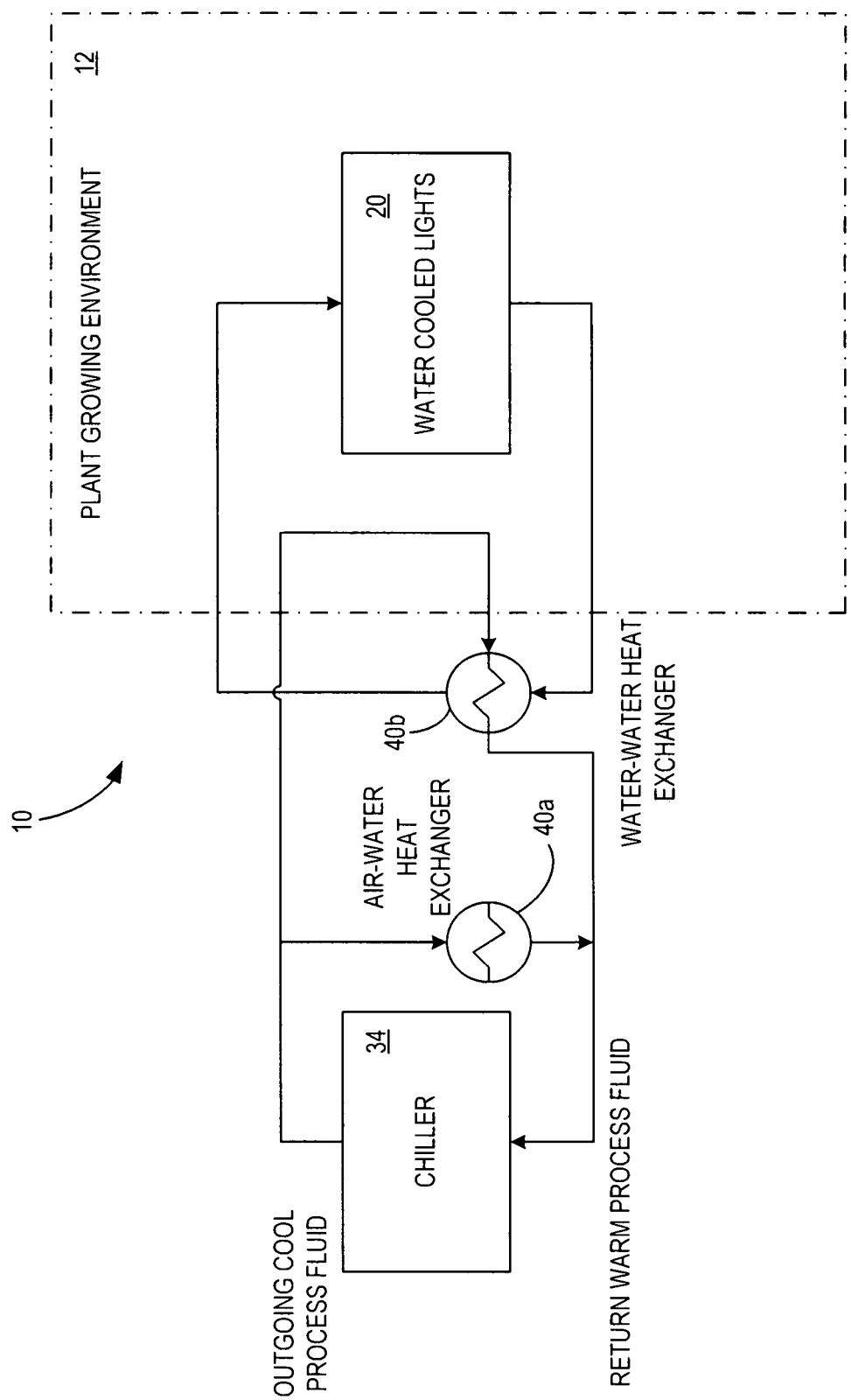
FIG. 10 is a schematic view illustrating a chiller-lights-two exchanger loop of the lights integrated cooling system for indoor growing environments, constructed in accordance with the present invention, having an air-water heat exchanger and a water-water heat exchanger.

A chiller-lights-exchanger parallel loop, as best illustrated in FIG. 9, is provided. The heat exchanger 40 is used in parallel with the light bars 20. Both loops have their own pumps 42, 44 to meet the required flow rates. The exchanger 40 is responsible for all cooling and dehumidification processes. The light bars 20 are insulated from the environment 12, preventing condensation even when the LWT is at low temperatures. Running colder water through the LED light bars 20 will decrease the temperature of the LEDs. LED light bars 20 operating at lower temperatures can increase their efficiency and light output. As illustrated in FIG. 10, an air-water heat exchanger 40a and a water-water heat exchanger 40b can be used together.

Figure 11:
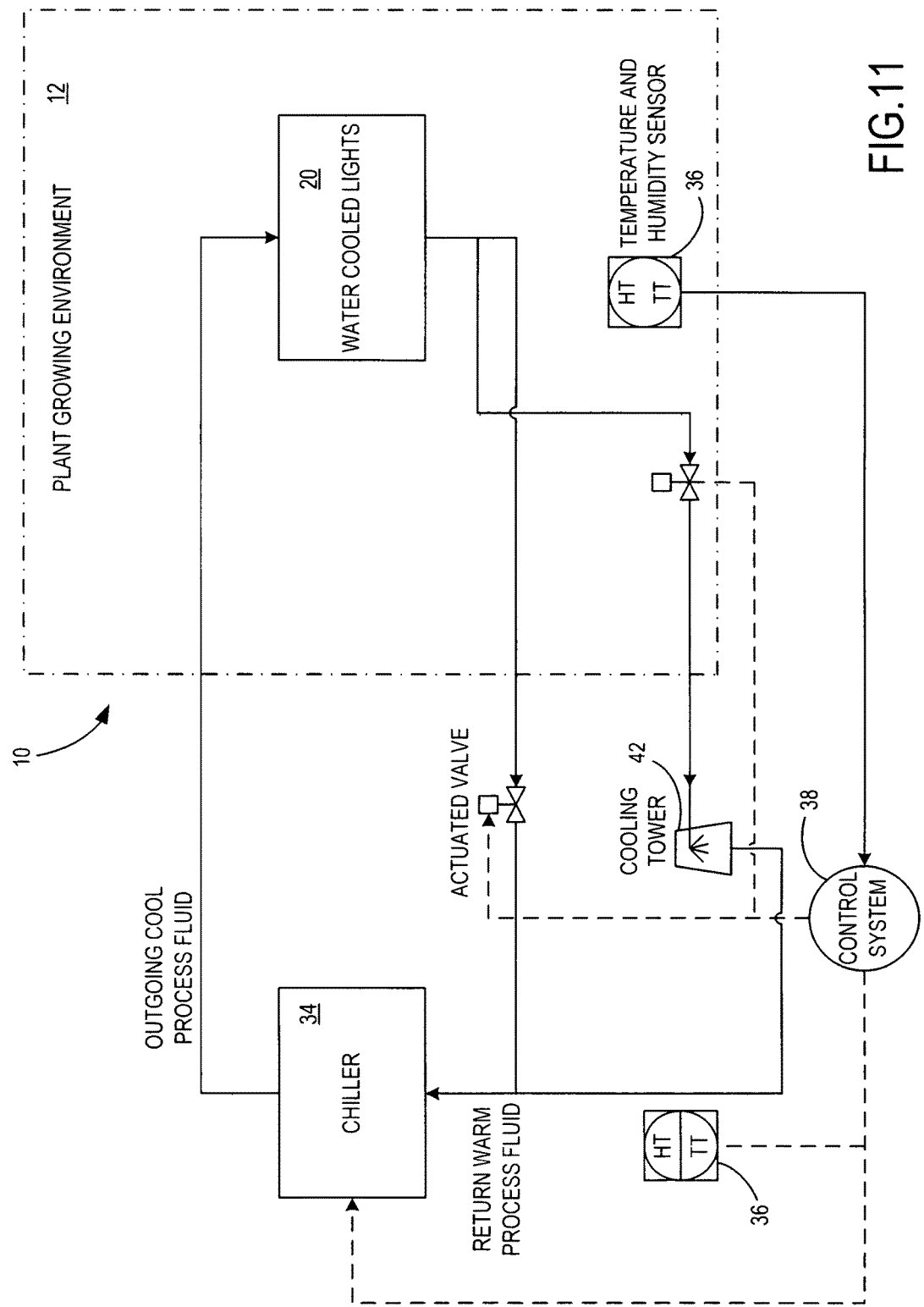
FIG. 11 is a schematic view illustrating a chiller-lights-cooling tower loop of the lights integrated cooling system for indoor growing environments, constructed in accordance with the present invention, with a cooling tower added to the cooling system for taking advantage of passive cooling.

As best illustrated in FIG. 11, a chiller-lights-cooling tower loop is provided. A cooling tower 42 can be added to the cooling system 10 to take advantage of passive cooling when the conditions are appropriate. This can be used as a "pre-cooling" device, or if the conditions are right it could take on the entire cooling load. The chiller 34 will never reach its temperature set point preventing the compressor built in from activating. In some conditions, the water cooling tower 42 can provide too much cooling. In that event, some of the water can be diverted straight into the chiller 34 where warmer water will mix with the cooler water.

Figure 12:
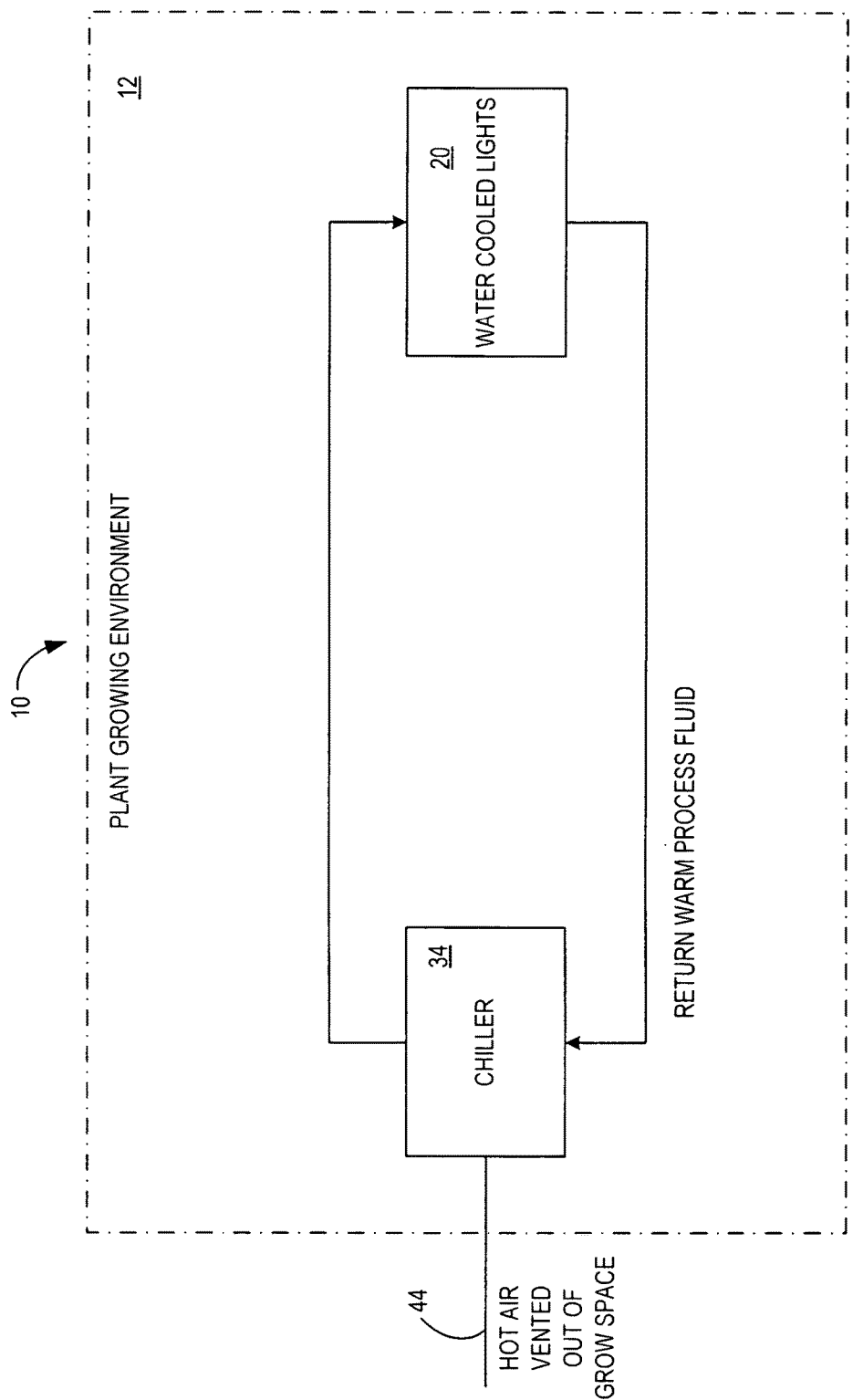
FIG. 12 is a schematic view illustrating a chiller-lights-vented air of the lights integrated cooling system for indoor growing environments, constructed in accordance with the present invention, having ducts or piping used to move the hot air or water out of the grow space.

Finally, as best illustrated in FIG. 12, a chiller-lights-vented air is provided. The chiller 34 can be placed in the growing environment. To prevent it from adding to the heat load it's trying reduce, ducts 44 or piping can be used to move the hot air or water out of the grow space 12. In the event heating is required, some of that hot air or water can then be used to re-heat the environment.

It should be noted that no system described above is necessarily mutually exclusive. Many of the concepts from each can be used to complement each other and create a more efficient system. Depending on the location and setup, different systems will be more efficient.

The lights integrated cooling system 10 of the present invention can also be used for dehumidification when condensation fins are attached to the bar. In this instance, as the lights integrated cooling system 10 cools the growing environment with cool water, a flush of extra cold water can be sent through the system 10, leading to condensation on the condensation fins of the light bars 20. Condensation runs down the fins to a collection cap at the bottom of the light bars 20 where condensation can pool and be evacuated by an attached vacuum pump and tubing system.

The lights integrated cooling system 10 of the present invention allows the growing environment temperature to be very closely controlled by the same system that cools the lights. It simplifies the typical HVAC installation and requirements of growing environments by eliminating the need for significant installations of ducting for air flow, removal, and treatment. It can also reduce or eliminate the need for heat-based air exchanges in the growing environment.

The economic potential of the lights integrated cooling system 10 of the present invention is high by eliminating significant HVAC costs for growing environments. Chillers are also less expensive to buy and operate than HVAC systems, allowing growers to reduce initial capital costs of growing facility construction as well as ongoing operational expenses, simply by integrating light bars 20 and cooling.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

What is claimed is:

1. A lights integrated cooling system for providing environmental temperature control of an indoor growing environment, the lights integrated cooling system comprising:
    a frame structure having a top plumbing manifold and a bottom plumbing manifold;
    at least one water cooled light bar having a first end and a second end, the first end of the at least one water cooled light bar being fluidly connected to the top plumbing manifold and the second end of the at least one water cooled light bar being fluidly connected to the bottom plumbing manifold, wherein heat generated by the at least one water cooled light bar is transferred to the indoor growing environment;
    a chiller fluidly connected to the top plumbing manifold, the at least one water cooled light bar and the bottom plumbing manifold;
    a pump for circulating a coolant through the chiller, the top plumbing manifold, the at least one water cooled light bar, and the bottom plumbing manifold, wherein heat generated by the at least one water cooled light bar is transferred to the coolant, and wherein the chiller reduces the temperature of the coolant received from the at least one water cooled light bar;
    a temperature sensor configured to monitor an indoor growing environment temperature; and
    a control system coupled to the pump and the temperature sensor, said control system configured to maintain a predetermined target temperature within the indoor growing environment by regulating a coolant temperature corresponding to the coolant exiting the chiller.

2. The lights integrated cooling system of claim 1 and further comprising:
    a top quick connect union fluidly connected to and releasably secured between the first end of the at least one light bar and the top plumbing manifold; and
    a bottom quick connect union fluidly connected to and releasably secured between the second end of the at least one light bar and the bottom plumbing manifold.

3. The lights integrated cooling system of claim 1 and further comprising at least one flow switch configured to control coolant flow through the at least one light bar.

4. The lights integrated cooling system of claim 3, the at least one flow switch configured to deactivate the at least one light bar when coolant flow is interrupted.

5. The lights integrated cooling system of claim 2, the at least one light bar comprising a first light portion, a second light portion, and a center quick connect union fluidly connected to and releasably secured between the first light portion and the second light portion.

6. The lights integrated cooling system of claim 1 and further comprising:
    a plurality of condensation fins attached to the at least one light bar; and
    a collection cap adjacent to the second end of the at least one light bar;
    wherein condensation from the at least one light bar travels along the condensation fins and collects in the collection cap.

7. The lights integrated cooling system of claim 1 wherein the control system regulates the coolant temperature corresponding to the coolant exiting the chiller by adjusting a chiller temperature set point.

8. The lights integrated cooling system of claim 1 and further comprising
    a flow control valve, wherein the control system regulates the coolant temperature corresponding to the coolant exiting the chiller by regulating coolant flow through the at least one light bar using the flow control valve.

9. The lights integrated cooling system of claim 1 and further comprising:
    a humidity sensor configured to monitor an indoor growing environment humidity, the humidity sensor coupled to the control system.

10. The lights integrated cooling system of claim 1 and further comprising:
    an air-fluid heat exchanger fluidly connected in series between the chiller and the at least one light bar, wherein the pump controls the flow rate of the coolant flowing through the chiller, the air-fluid heat exchanger, the top plumbing manifold, the at least one water cooled light bar, and the bottom plumbing manifold.

11. The lights integrated cooling system of claim 10 and further comprising:
ducting for distributing air from the air-fluid heat exchanger throughout the indoor growing environment.

12. The lights integrated cooling system of claim 1 and further comprising:
a cooling tower fluidly connected between the chiller and the at least one light bar, the cooling tower configured to passively cool the coolant.

\* \* \* \* \*